E. E. & L. G REED.
Cultivator and Roller.
No. 104,498.
Patented June 21, 1870.
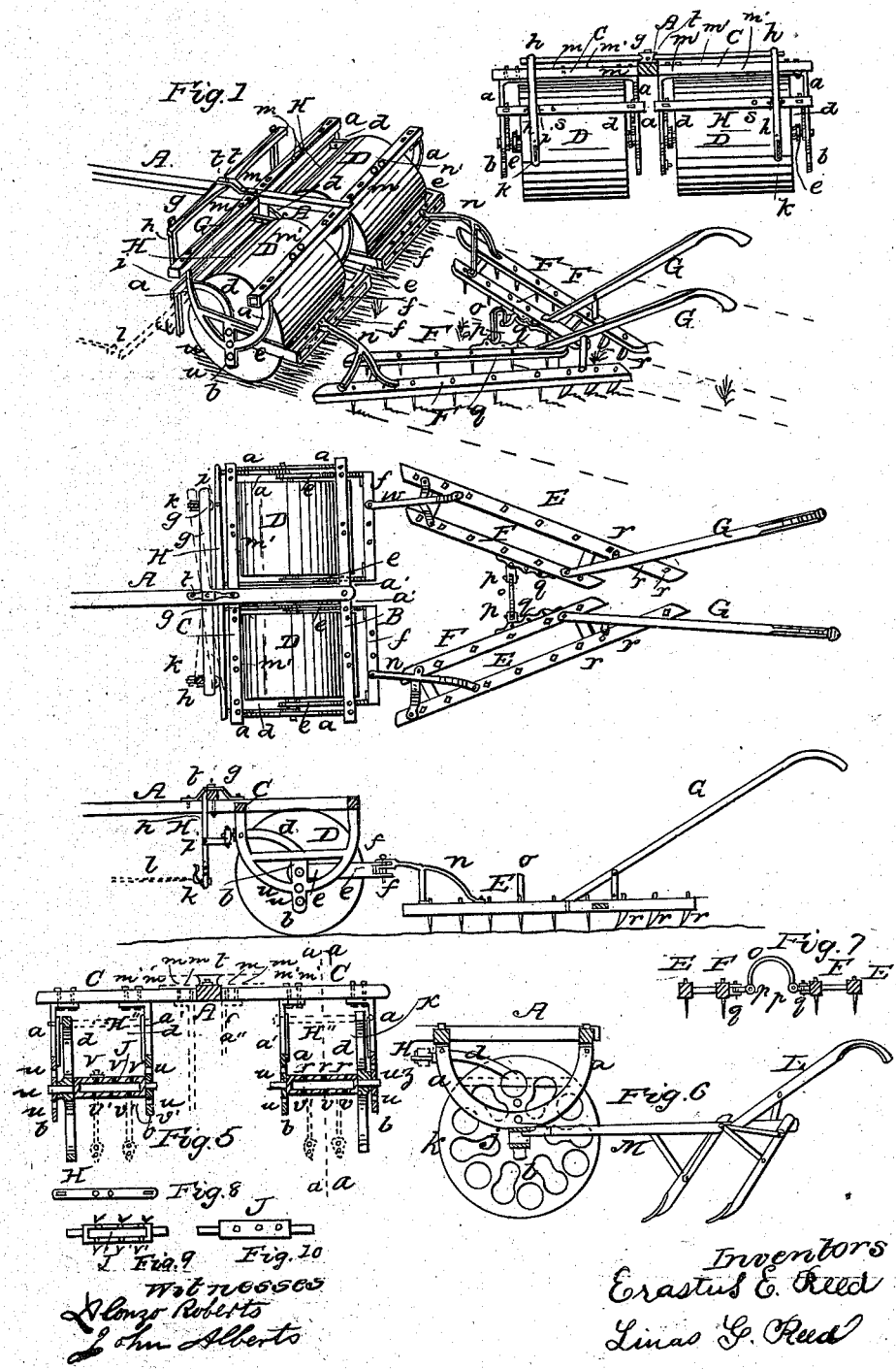

United States Patent Office.

LINAS G. REED AND ERASTUS E. REED, OF STARK COUNTY, ILLINOIS.

Letters Patent No. 104,498, dated June 21, 1870.

IMPROVEMENT IN CULTIVATOR AND ROLLER COMBINED.

The Schedule referred to in these Letters Patent and making part of the same.

*To all whom it may concern:*

Be it known that we, LINAS G. REED and ERASTUS E. REED, both of Stark county, in the State of Illinois, have invented a Combined Roller, Harrow, and Cultivator for Corn; and we do hereby declare that the following is a full, clear, and exact description of the construction and operation of the same, reference being had to the accompanying drawing making a part of this specification, in which—

Figure 1 is a perspective view of the combination of the rollers and harrows.

Figure 2 is a front elevation of the same.

Figure 3 is a plan view.

Figure 4 is a side elevation.

Figure 5 is a front elevation, showing substitution of axles for attachment of cultivators when rollers and harrows are removed, being the second combination.

Figure 6 is a side elevation of or section through $a$ $a$, fig. 5, of frame, wheels, and cultivator, in second combination.

Figure 7 is a cross section of harrow, showing uniting-link or hinge.

Figure 8 is a view of bar for draft, which unites the castings or wheel-bearings.

Figure 9 is a section of axle used for attachment of wheels for drawing the cultivator.

Figure 10 is a plan view of same.

Like letters in the different figures of the drawing indicate like parts.

This improvement relates to the combination of rollers in a frame followed by harrows in one machine and the mode of removing the rollers and replacing them by wheels in the frame, by which a pair of shovel-plows are afterwards substituted for the harrow, for cultivating corn, when the plants have increased to larger size, thus performing two farming operations at one and the same time by the first combination of rollers and harrows.

A is the tongue for draft, passing across the top of the frame.

B, the transverse rear bar of frame, which is attached to the rear end of tongue.

C, front bar attached to and intersecting the tongue at a right angle and parallel with the rear bar of frame.

D D, two rollers whose axles are in the same line and parallel and between the bars B and C, and carrying and inclosing-frame $e$, united by the double shelves $ff$ behind the roller, which shelves are pierced with bolt-holes.

E F G relate to the harrow.

H H, two horizontal bars beneath the front bar C of the frame, and attached at either end to the end of one of the segmental braces $d$, by movable pins or bolts $z$, fig. 6, each bar H being bolted to an outer and one of the inner segments $d$ $d$.

To these bars the clevices $i$, for the draft arrangement, are attached, one clevis to each bar. These latter are adjustable to another point, S, on the bar, to regulate the draft at pleasure. To these clevices are secured, by bolt, the middle part of the upright draft-bars $h$ $h$, the upper part of each bar pressing backward against either end of the swinging horizontal bar $g$ bolted to the top of the pole or tongue.

The lower end of each vertical bar $h$ $h$ has a removable hook for attachment of traces or chains, and may be accommodated to either of the adjusting-holes at that end of bar.

It will be seen that the operation of these bars $h$ $h$ on the swing-bar $g$ regulates the draft. These bars are removed and substituted by shorter ones of same construction, H, fig. 8, when the rollers are removed, to make the machine a cultivator, that is, when the wheels are inserted.

J J, figs. 5 and 6, are two axles, each consisting of parallel horizontal plates uniting at the axle-point. These plates are pierced with several holes, V, to receive the jaw of one of the two cultivator-plows M. This axle is used when the rollers are dispensed with, in conjunction with the wheels K K, when the corn has grown too high to be cultivated by rolling and harrowing.

The jaw of each beam of the plows or cultivators may be adjusted higher or lower, to cut shallow or deep, by adjustment to holes in either of the parallel plates of the axles.

J J, fig. 6, represents the manner of adjustment and section of the axle.

In the use of these axles and wheels, it is presumed that the corn has grown so much that it will be necessary to allow the stalks to pass under machine as much space at the center of machine as possible and as high as the top of frame C B. To do this the two inner semicircular castings $a$ $a$, which support the frame, (see fig. 5,) are unbolted at $m$ $m$ on the bar C, and removed each toward its fellow on the side of machine and bolted through the holes there provided; $m'$ $m'$, in this position, each carries one of the inner ends of each of slotted axles J, the wheels K K being set on their outer ends, the axle points entering the outer casting $a$ $a$ of the same construction.

E and E and F and F are the parallel bars of the V-shaped double harrow, one pair attached to each of the roller-frames $ff$ by means of the iron braces $n$ $n$ bolted to the forward end of each pair of bars and adjustable to either the upper or lower shelf by means of the bolt-holes in each shelf, according to the depth of harrowing required.

The bars E F are united in any substantial manner several inches apart, each set converging nearly to a point and leaving a clear space between each harrow, six to eight inches apart in the rear behind the handles, one of the latter being bolted to each of the divisions. The inner bars F are set with iron teeth, the outer ones, E E, with teeth, excepting toward the rear, where several cultivator-shovels, r, are substituted to throw the harrowed soil well up to the young plants.

An iron casting, with upper and lower horizontal shelves pierced with bolt-holes, is attached to the inner side of each harrow, which receives one of the clevices, p, which, in turn, is hinged to the arched connecting-iron o, the whole forming a self-adjusting joint for the harrows.

The advantages of this invention or combination of double rollers with harrows carrying shovels, is that the soil on each side of young corn-plants can be crushed close up to them by the rollers, and thus made fine enough to secure the young growth the better against drought. The harrow following stirs the soil, and, finally, the shovels on end of harrows throw the soil close up to the plants on each side, the harrow being dodged or guided from injuring the corn by means of the handles; and that when the plants have grown too high for this mode of cultivation the rollers and harrow can be removed and the wheels and cultivator, or shovel-plows, M L, can be substituted, using either of axle-bearings, v, to set the frame B C above the stalks of corn.

The operation of this machine is as follows:

For cultivation of the young corn, the rollers D D are used, in connection with the harrow E F E F, one of the rollers and one of the divisions of harrow passing one on each side of the row of corn. The frame e of roller can be bolted to the supports a a, the better to form a support by which to adjust the jaws of the the braces n of the harrow for deeper or lighter harrowing.

The harrow accommodates itself to the lay of the soil, as it is, in divisions, united by a bridge, o, by which the swing or direction of the harrow may also be determined by setting one clevis of same further backward or forward.

The rollers crush the clods and break the soil, the harrow stirs it, and the shovels under the rear of the latter throw fine soil up to plants.

When the plants have grown so tall as to preclude use of rollers they are removed by unbolting the inner supports a a; then the slotted axles J J are used, first placing one of the wheels K K with each of outer supports, and on the axle bring one of the inner supports from the bolt-holes m m to those at m' m', and, securing the inner end of each axle as the corn still increases in height, the axle-holes u may be successively used for raising the frame.

Two cultivator-plows are attached, one to each of the slotted axles J J, using for the attachment of jaw of beam either of the sets of holes V in the plates or sides of slots, to raise or lower the beam in plowing.

The machine by this change allows the plants all the space between soil and top of frame. In shortening the spaces between the inner supports a a, it is necessary also to remove the bar H and substitute a shorter one, (see fig. 8,) to which to affix the draft, (see fig. 5,) when the position of inner supports are moved from a' a' to a'' a'', to support wheels.

Having described our invention fully, we do not claim anything on the harrow or cultivator, nor on the combination of either with the frame-work, as shown and set forth; but We do claim, and desire to secure by Letters Patent—

The arrangement of the tongue A, bars B, C, and H, inner supports a a' a' a, with one or more bearings u, frames e e, with bolt-holes, f, equalizing-bar g, oscillating bars h h, with adjustable draft-hooks k k, and slotted axles J J, with bolt-holes V, all substantially in the manner and for the purposes as set forth.

In testimony that we claim the foregoing combined rollers, harrow, and cultivator, we have hereunto set our hands this 2d day of October, 1869.

LINAS G. REED.
ERASTUS E. REED.

Witnesses:
WM. G. REED,
T. J. BOCOCK.